(12) United States Patent
Saini et al.

(10) Patent No.: US 10,287,823 B2
(45) Date of Patent: May 14, 2019

(54) BRAZE JOINTS WITH A DISPERSED PARTICULATE MICROSTRUCTURE

(71) Applicant: Halliburton Energy Services, Inc., Houston, TX (US)

(72) Inventors: Gagan Saini, The Woodlands, TX (US); William Brian Atkins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 226 days.

(21) Appl. No.: 15/105,218

(22) PCT Filed: Jun. 25, 2015

(86) PCT No.: PCT/US2015/037749
§ 371 (c)(1),
(2) Date: Jun. 16, 2016

(87) PCT Pub. No.: WO2016/209241
PCT Pub. Date: Dec. 29, 2016

(65) Prior Publication Data
US 2017/0191315 A1    Jul. 6, 2017

(51) Int. Cl.
*E21B 10/573*    (2006.01)
*E21B 10/567*    (2006.01)
(Continued)

(52) U.S. Cl.
CPC .............. *E21B 10/46* (2013.01); *E21B 10/42* (2013.01); *E21B 10/567* (2013.01); *E21B 10/5735* (2013.01); *B23P 15/28* (2013.01)

(58) Field of Classification Search
CPC .... E21B 10/5735; E21B 10/573; E21B 10/46; E21B 10/567; E21B 10/42; B23P 15/28;
(Continued)

(56) References Cited

U.S. PATENT DOCUMENTS 3,342,971 A * 9/1967 Kaarlela .............. B23K 1/0014
                                                219/85.17
4,931,363 A   6/1990 Slutz et al.
(Continued)

FOREIGN PATENT DOCUMENTS

CN    1491145 A    4/2004
GB    2438073 A    11/2007

OTHER PUBLICATIONS

Leinenbach et al. Influence of Brazing Parameters . . . Apr. 2015 ResearchGate IBSC2015 (Year: 2015).*
(Continued)

*Primary Examiner* — George S Gray
(74) *Attorney, Agent, or Firm* — Alan Bryson; C. Tumey Law Group PLLC (57) ABSTRACT

The microstructure of braze joints in polycrystalline diamond compact (PDC) cutters may be tailored to increase the shear strength of the braze joint, for example, by increasing the amount of a dispersed particulate microstructure therein. A method for forming a dispersed particulate microstructure may include brazing a polycrystalline diamond table to a hard composite substrate with a braze alloy at a braze temperature between 5° C. above a solidus temperature of the braze alloy and 200° C. above a liquidus temperature of the braze alloy; and forming a braze joint between the polycrystalline diamond table and the hard composite substrate that comprises at least 40% by volume of the dispersed particulate microstructure composed of a particulate intermetallic phase having a diameter of 0.5 μm to 2.0 μm and an aspect ratio of 1 to 5 dispersed in a ductile matrix.

12 Claims, 6 Drawing Sheets

(51) Int. Cl.
  *B23P 15/28* (2006.01)
  *B23K 1/00* (2006.01)
  *B23K 35/00* (2006.01)
  *E21B 10/46* (2006.01)
  *E21B 10/42* (2006.01)

(58) Field of Classification Search
  CPC ............ B23K 35/0255; B23K 35/0244; B23K 35/0222; B23K 35/30; B23K 35/3006; B23K 1/0008
  See application file for complete search history.

(56) References Cited

U.S. PATENT DOCUMENTS

| | | | |
|---|---|---|---|
| 5,127,969 A * | 7/1992 | Sekhar | ............... B23K 35/0222 |
| | | | 148/23 |
| 5,874,175 A | 2/1999 | Li | |
| 6,054,693 A | 4/2000 | Barmatz et al. | |
| 7,487,849 B2 | 2/2009 | Radtke | |
| 8,061,454 B2 | 11/2011 | Voronin et al. | |
| 8,763,730 B2 | 7/2014 | Cariveau et al. | |
| 8,821,603 B2 | 9/2014 | Bitler et al. | |
| 2003/0066650 A1 | 4/2003 | Fontana et al. | |
| 2003/0234280 A1 * | 12/2003 | Cadden | ................ B23K 1/0016 |
| | | | 228/250 |
| 2006/0254830 A1 | 11/2006 | Radtke | |
| 2007/0205023 A1 | 9/2007 | Hoffmaster et al. | |
| 2008/0230279 A1 | 9/2008 | Bitler et al. | |
| 2009/0032169 A1 | 2/2009 | Dourfaye et al. | |
| 2009/0173547 A1 | 7/2009 | Voronin et al. | |
| 2013/0022836 A1 | 1/2013 | Easley et al. | |
| 2013/0068539 A1 | 3/2013 | Vempati et al. | |
| 2013/0273820 A1 | 10/2013 | Sung | |
| 2014/0013913 A1 | 1/2014 | Bao | |
| 2014/0069727 A1 | 3/2014 | Belnap | |
| 2014/0283457 A1 * | 9/2014 | Cariveau | ................. B22F 7/062 |
| | | | 51/309 |

OTHER PUBLICATIONS

ISR/WO for PCT/US2015/037749 dated Mar. 10, 2016.
China P.R. Search Report for Application No. 201580079295.9 dated Aug. 16, 2018.
Chinese Office Action for Application No. 201580079295.9 dated Sep. 19, 2018.
K. Korean office action, "Office Action from S. Korean Patent Office for application No. 2017-7030833 dated Jan. 9, 2019".

* cited by examiner

BRAZE JOINTS WITH A DISPERSED PARTICULATE MICROSTRUCTURE

BACKGROUND

The present application relates to braze joints in polycrystalline diamond compact cutters.

Drill bits and components thereof are often subjected to extreme conditions (e.g., high temperatures, high pressures, and contact with abrasive surfaces) during subterranean formation drilling or mining operations. A polycrystalline diamond table is often used as an outer portion of polycrystalline diamond compact cutters ("PDC cutters"). The PDC cutters are attached to the drill bit so that the polycrystalline diamond table engages the subterranean formation during drilling. Polycrystalline diamond tables of the PDC cutters have beneficial wear resistance, hardness, and ability to conduct heat away from the point of contact with the formation that enhance the lifetime of the drill bit.

Most commonly, a PDC cutter is formed in a single high-pressure, high-temperature ("HPHT") press cycle. During the process, diamond particles are placed together with a hard composite substrate in a press. During the press cycle, the diamond particles are sintered, and a catalyzing material facilitates both the bonding between the diamond particles to form a polycrystalline diamond table and to attach the polycrystalline diamond table to the hard composite substrate. In most of the cases, the hard composite provides a source for the catalyzing material (e.g., cobalt, nickel, iron, Group VIII elements, and alloys thereof) that facilitates bonding between the diamond particles. For example, when cobalt-cemented tungsten carbide is the hard composite substrate, the cobalt catalyzing material may melt and enter into the interstitial spaces of the diamond particles. In some instances, catalyzing material may also be mixed with the diamond particles before sintering.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to brazing diamond to a substrate to create a polycrystalline diamond compact (PDC) cutter and, more specifically, to increasing the shear strength of the resulting braze joint.

Figure 1A:
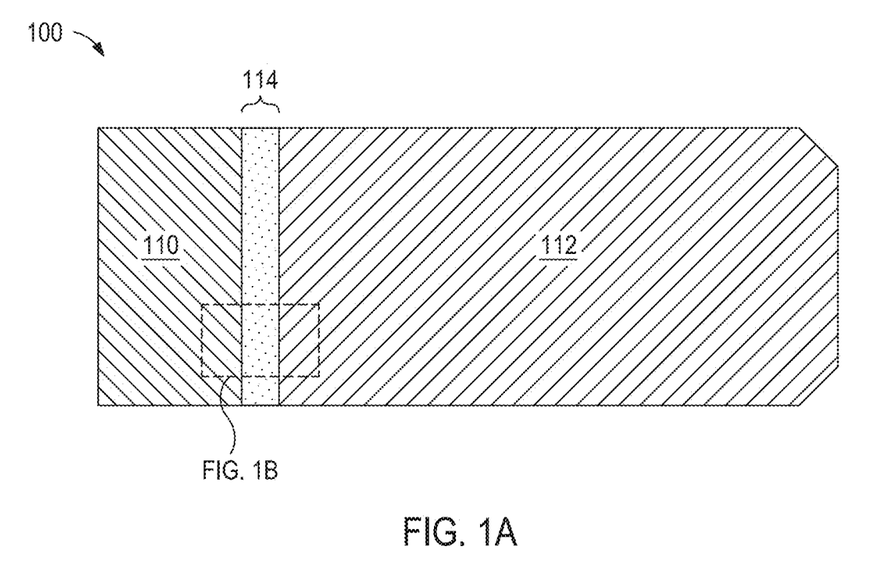
FIG. 1A is a cross-sectional side view of an exemplary PDC cutter according to at least some embodiments of the present disclosure.

FIG. 1A is a cross-sectional side view of an exemplary PDC cutter 100 according to at least some embodiments of the present disclosure. The PDC cutter 100 is formed by bonding a polycrystalline diamond table 110 to a hard composite substrate 112 at a braze joint 114.

The hard composite substrate 112 is typically a composite of reinforcing particles like metal carbides, metal nitrides, or refractory ceramics dispersed in metallic binder like cobalt, copper, iron, nickel, zinc, or alloys thereof. The polycrystalline diamond table 110 may be formed by any suitable method. Typically, the polycrystalline diamond table 110 is formed in a press by HPHT sintering. However, an as-formed polycrystalline diamond table generally has catalyzing material remaining within the interstitial spaces between the fused diamond particles. The residual catalyzing material can cause deleterious effects when placed in service on a downhole cutting tool such as a drill bit, such as due to a mismatch in the coefficients of thermal expansion of the diamond and the catalyzing material (i.e., a CTE mismatch). At least a portion of the catalyzing material may therefore be subsequently removed from at least a working surface of the polycrystalline diamond table to reduce these effects, and in some case to produce a thermally stable polycrystalline ("TSP") diamond table. The process of removing catalyzing material is generally referred to as leaching, and may be implemented by any of a variety of techniques such as by subjecting the polycrystalline diamond table to an acid bath.

In some embodiments, the polycrystalline diamond table 100 may first be formed on another substrate in an HPHT press cycle, and removed from the substrate for leaching or other further processing, prior to re-attachment to the substrate 112 for use as the PDC cutter 100 in a drill bit or other downhole tool. In alternative embodiments, the polycrystalline diamond table 100 may be formed separately in an HPHT sintering method, without a hard composite substrate, and later attached to the substrate 112. In this instance, the catalyzing material may be metallic (e.g., cobalt, nickel, iron, Group VIII elements, and alloys thereof) or non-metallic (e.g., $MgCO_3$, $CaCO_3$, $SrCO_3$, $BaCO_3$, $MgSO_4$, $CaSO_4$, $SrSO_4$, and $BaSO_4$). In such cases, after forming the polycrystalline diamond table without the use of a substrate, the metallic catalyzing material may be removed from the polycrystalline diamond table to produce a TSP diamond table. Where a non-metallic catalyzing material is used, it may not be necessary to remove the catalyzing material. Unless otherwise specified, when referring to a polycrystalline diamond table 110 portion of a PDC cutter, the polycrystalline diamond table 110 may be a polycrystalline diamond table formed according to any suitable method including, but not limit to, the foregoing methods.

There are a number of available methods for attaching the polycrystalline diamond table 110 to the substrate 112. One such method involves placing the diamond table 110, which was previously formed in a first HPHT press cycle, back in a press with the substrate 112 to attach the diamond table 110 to the substrate 112 in a second HPHT press cycle. Another set of methods under investigation involve brazing the diamond table 110 to the substrate 112, which can be performed without the use of a press and therefore avoids the need for a second HPHT press cycle. Generally, when brazing a polycrystalline diamond table 110 to a hard composite substrate 112, the braze joint 114 is the portion of the PDC cutter 100 most susceptible to failure, primarily by shear. When the braze joint shears during a drilling operations, the polycrystalline diamond table 110 is removed from the PDC cutter 100, which reduces the efficacy and lifetime of the drill bit.

The braze joints 114 in the present application are formed using a temperature profile and braze alloys that produce a dispersed particulate microstructure composed of a particulate inter-metallic phase having a diameter of 0.5 µm to 2.0 µm and an aspect ratio of 1 to 5 dispersed in a ductile matrix. While the term "diameter" is used above to refer to the particulate inter-metallic phase, it should be noted that the cross-section need not be circular. Rather, where the cross-section in non-circular, the term "diameter" refer to the length that transverse through the center of a circle drawn to overlay and fully encompass the cross-section. The "cross-section" refers a cut made perpendicular to the longest length of the particulate inter-metallic phase.

The dispersed particulate microstructure has a greater shear strength than other microstructures, including microstructures with an inter-metallic phase with larger particulate sizes or more elongated (e.g., worm-like) structures dispersed in the ductile matrix. Such more elongated structures of an inter-metallic phase are known as a "eutectic microstructure" where the elongated structures tend to interconnect with neighboring structures, which tends to make eutectic microstructures brittle. While the aspect ratio of the elongated structures may vary, the aspect ratio is sufficient to cause interconnection with neighboring structures. Without being limited by theory, it is believed that cracks can propagate more readily along and between larger particulate sizes or more elongated structures as compared to the segregated particulates in the dispersed particulate microstructure. Because cracks may more readily propagate therethrough, the shear strength of braze joints may decrease when the eutectic microstructures and microstructures with larger particulate sizes are present in higher concentrations. While eutectic microstructures and microstructures with larger particulate sizes are undesirable, the presence of a small percentage of these microstructures versus dispersed particulate microstructure acceptable.

In some embodiments, the braze joints 114 described herein include the dispersed particulate microstructures in an amount of at least 40% by volume. In some instances the braze joints 114 may include the dispersed particulate microstructures in an amount of at least 50% by volume, 60% by volume, at least 70% by volume, at least 80% by volume, or at least 90% by volume.

Figure 1B:
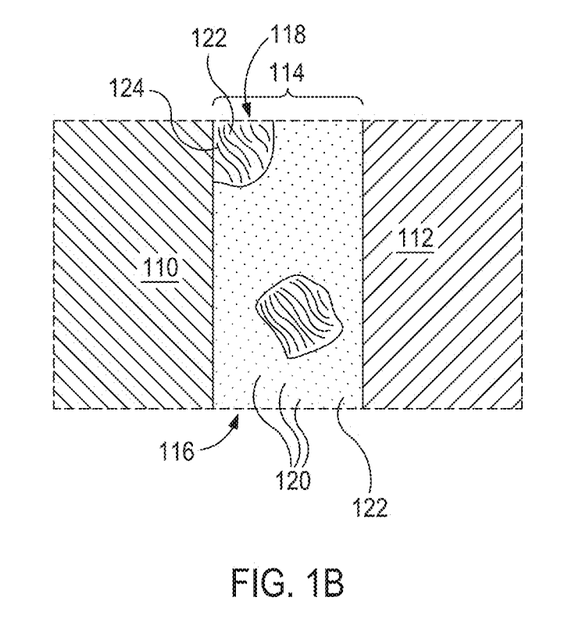
FIG. 1B illustrates a magnified cross-sectional side view of the exemplary PDC cutter where the braze joint includes both dispersed particulate microstructures and other microstructures.

FIG. 1B illustrates a magnified portion of the exemplary PDC cutter 100, as indicated in FIG. 1A, where the braze joint 114 includes both a dispersed particulate microstructure 116 and a eutectic microstructure 118. As illustrated, the dispersed particulate microstructure 116 includes a particulate inter-metallic phases 120 dispersed in a ductile matrix 122 along with eutectic microstructures 118, which include an inter-connected elongated inter-metallic phases 124 dispersed in the ductile matrix 122.

When determining the volume percent of the dispersed particulate microstructure 116 in the braze joint 114, a cross-section of the braze joint 114 may be imaged with scanning electron microscopy or other suitable imaging techniques. Once imaged, the cross-section can be partitioned into areas that are the dispersed particulate microstructures 116 (comprising particulate inter-metallic phases dispersed in a ductile matrix) and the other microstructures 118, wherein other microstructures 118 may be structures of larger particulate size than the particulate inter-metallic phases or may be eutectic microstructures. Then, a volume percent may be derived from the area of the dispersed particulate microstructures 116 divided by the total area (i.e., the area of the dispersed particulate microstructures 116 plus the area of the other microstructures 118). ASTM E562-11 may be used as a standard method of determining volume fraction once the cross-section is partitioned into areas representing individual microstructures.

The ductile matrix of the dispersed particulate microstructures are braze alloys. Such braze alloys suitable for use in producing the braze joints 114 described herein may be a base alloy with an active element (also referred to as an "active carbide former") that assists in wetting the polycrystalline diamond table 110 and forming a carbide layer at the interface both with the polycrystalline diamond table 110 and the hard composite substrate 112 when forming the braze joint 114. The concentration of the active element may vary from 0.5% by weight to the braze alloy to 20% by weight of the braze alloy. Exemplary base alloys may include, but are not limited to, silver (Ag), gold (Au), copper (Cu), nickel (Ni), palladium (Pd), boron (B), chromium (Cr), silicon (Si), titanium (Ti), molybdenum (Mo), vanadium (V), iron (Fe), aluminum (Al), manganese (Mn), cobalt (Co), or any combinations, mixtures, or alloys thereof. Exemplary active elements may include, but are not limited to, titanium, hafnium (Hf), vanadium, zirconium, chromium, tungsten (W), molybdenum, manganese, yttrium (Y), niobium (Nb), tantalum (Ta), or any combinations, mixtures, or alloys thereof. Specific exemplary braze alloys may include, but are not limited to, (1) 81.25% Au, 18% Ni, 0.75% Ti; (2) 82% Au, 16% Ni, 0.75% Mo; (3) 20.5% Au, 66.5% Ni, 2.1% B, 5.5% Cr, 3.2% Si, 2.2% Fe; (4) 56.55% Ni, 30.5% Pd, 2.45% B, 10.5% Cr; (5) 92.75% Cu, 3% Si, 2% Al, 2.25% Ti; (6) 82.3% Ni, 3.2% B, 7% Cr, 4.5% Si, 3% Fe; (7) 96.4% Au, 3% Ni, 0.6% Ti; (8) 52.5% Cu, 9.5% Ni, 38% Mn; (9) 31% Au, 43.5% Cu, 9.75% Ni, 9.75% Pd, 16% Mn; (10) 54% Ag, 21% Cu, 25% Pd; (11) 67.5% Cu, 9% Ni, 23.5% Mn; (12) 58.5% Cu, 10% Co, 31.5% Mn; (13) 35% Au, 31.5% Cu, 14% Ni, 10% Pd, 9.5% Mn; (14) 25% Su, 37% Cu, 10% Ni, 15% Pd, 13% Mn; (15) 35% Au, 62% Cu, 3% Ni; (16) 54% Ti, 25% Cr, 21% V; (17) 57% Ag, 38% Cu, 5% Ti; (18) 70% Ag, 26.5% Cu, 4.5% Ti; (19) 96% Ag, 4% Ti; (20) 67% Ti, 33% Ni; and (21) 54% Pd, 38% Ni, 8% Si.

In some instances, the braze alloys may further include particulates dispersed therein. The particulates may be metallic particulates, ceramic particulates, or a combination thereof, have a diameter of 0.1 µm to 5.0 µm, and have an aspect ratio of 1 to 10.

Exemplary metals that the metallic particulates are composed of may include, but are not limited to, copper, titanium, nickel, cobalt, zinc, gold, silver, platinum, palladium, titanium, and the like, and alloys thereof. Exemplary ceramics that the ceramic particulates are composed of may include, but are not limited to, diamond, nanodiamond, carbon nanotubes, quartz, silica, titania, alumina, and the like.

In some instances, depending on the compositions of the base alloy, the active element, and the particulates of the braze alloy, the particulates may react or alloy with the base alloy, the active element, or both. For example, using diamond particulates in combination with an active element in the braze alloy may result in a carbide of the active element at the surface of the diamond particulates in the final braze joint.

The dispersed particulate microstructure in the braze joint 114 may be achieved by controlling the conditions of forming the braze joint 114 relative to the composition of the braze alloy.

When forming the braze joint 114, the braze alloy (which could be in form of paste or foil) may be disposed between the polycrystalline diamond table 110 and the hard composite substrate 112 and subsequently heated to a braze temperature, and then cooled. As used herein, the term "braze temperature" refers to the highest temperature of the brazing process.

The braze temperature described herein to achieve the dispersed particulate microstructure may be between 1° C. above a solidus temperature of the braze alloy and 200° C. above a liquidus temperature of the braze alloy. The "solidus temperature" is the highest temperature at which an alloy is completely solid. The "liquidus temperatures" is the lowest temperature at which an alloy is completely liquid. The solidus and liquidus temperatures depend on the composition of the braze alloy including the base alloy, the active material, and the weight percent of active material in the braze alloy. In some embodiments, the braze temperature may be between 1° C. above the solidus temperature of the braze alloy and 100° C. above the liquidus temperature of the braze alloy. In some embodiments, the braze temperature may be between 1° C. above the solidus temperature of the braze alloy and 50° C. above the liquidus temperature of the braze alloy. In some embodiments, the braze temperature may be between 1° C. above a solidus temperature of the braze alloy and the liquidus temperature of the braze alloy. In some embodiments, the braze temperature may be between 5° C. above the solidus temperature of the braze alloy and 200° C. above the liquidus temperature of the braze alloy. In some embodiments, the braze temperature may be between 5° C. above the solidus temperature of the braze alloy and 100° C. above the liquidus temperature of the braze alloy. In some embodiments, the braze temperature may be between 5° C. above the solidus temperature of the braze alloy and 50° C. above the liquidus temperature of the braze alloy. In some embodiments, the braze temperature may be between 5° C. above a solidus temperature of the braze alloy and the liquidus temperature of the braze alloy.

The conditions that may be controlled during the formation of braze joint 114 so as to achieve the dispersed particulate microstructure may include, but are not limited to, the inclusion or absence of isotherms during heating and cooling, a heating and cooling rate between isotherms occurring during heating and cooling, the time and temperature of the isotherms occurring during heating and cooling, and the time and temperature of a braze temperature isotherm. In some instances, more than one set of conditions may achieve the dispersed particulate microstructure for a braze joint 114 of a specific braze alloy composition, such as the time of isotherms during heating and cooling rate between isotherms occurring during cooling.

Figure 2:
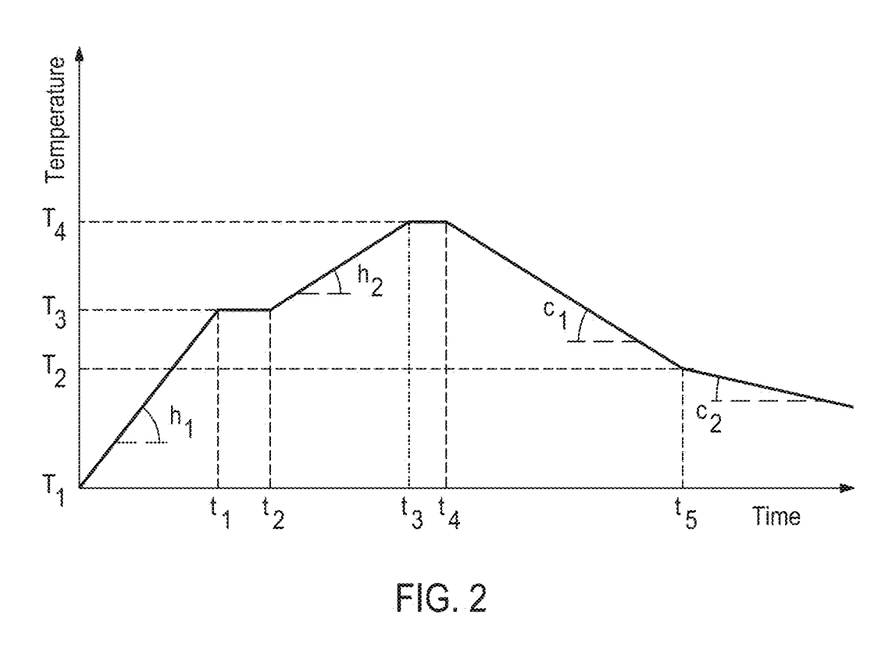
FIG. 2 illustrates an exemplary temperature profile as a function time for forming a braze joint.

FIG. 2 illustrates an exemplary temperature profile as a function of time for forming a braze joint 114. As indicated in the temperature profile, the temperature is increased from an initial temperature $T_1$ (typically room temperature) to an intermediate temperature $T_3$ at a heating rate of $h_1$. The temperature is held at a $T_3$ isotherm for a time of $t_2$-$t_1$. The temperature is then raised at a heating rate of $h_2$ to a braze temperature $T_4$ and held at the $T_4$ isotherm for a time of $t_4$-$t_3$. The temperature is then decreased at a cooling rate of $c_1$ until achieving an intermediate temperature $T_2$, followed immediately (i.e., without an isotherm) at time $t_5$ to a cooling rate of $c_2$.

The temperature profile for achieving the dispersed particulate microstructure 118 for a specific braze alloy may be determined experimentally. In some instances, when a temperature profile is known for achieving the dispersed particulate microstructure 118 with a braze alloy, the known temperature profile may be used to guide experimentation with a different braze alloy (e.g., a braze alloy that varies in weight percentage of active element) having an unknown temperature profile for achieving the dispersed particulate microstructure 118. For example, if the temperature profile for a copper-silver eutectic alloy having a 5% titanium active element is known, the temperature profile for a copper-silver eutectic alloy having a 7% titanium active element may be determined experimentally where the known temperature profile for the 5% titanium braze alloy provides a basis for starting the experimentation.

In some embodiments, a temperature profile may be as simple as heating the braze alloy at a single heating rate to the braze temperature, holding the braze temperature isotherm for a specified time, and cooling at a single cooling rate.

In some instances, the braze temperature isotherm may extend from 1 second to 30 minutes. In some instances, the braze temperature may be from 500° C. to 1100° C. In some instances, 30 minutes and may be at any temperature up to the braze temperature (e.g., from 100° C. to below the braze temperature, such as 5° C. below). In some embodiments, heating rates and cooling rates may be from 0.5° C./min to 50° C./min.

Brazing may be performed at reduced pressures (e.g., 1 kPa to 100 kPa) or ambient pressures (e.g., 100 kPa to 103 kPa depending on altitude). In some instances, the atmospheric compositions during brazing may be air, argon, nitrogen, and the like, or any mixture thereof. Inter atmospheres and reduced pressures may be particularly useful for higher braze temperatures.

Figure 3:
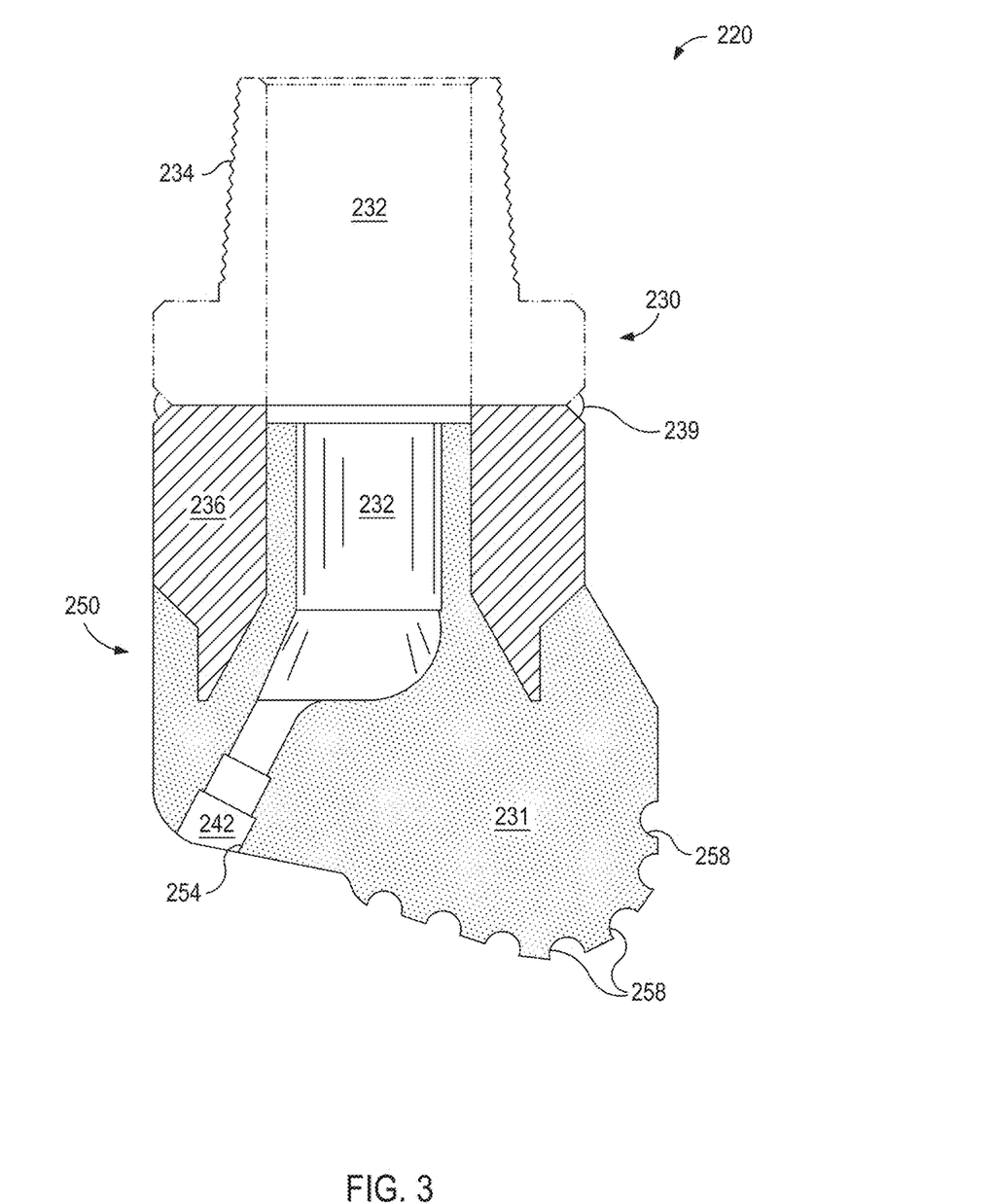
FIG. 3 is a cross-sectional view of a matrix drill bit having a matrix bit body formed by a hard composite material.

FIG. 3 is a cross-sectional side view of a matrix drill bit 220 having a matrix bit body 250 formed by a hard composite material 231. Exemplary hard composite materials may include, but are not limited to, reinforcing particles dispersed in a binder material. As used herein, the term "matrix drill bit" encompasses rotary drag bits, drag bits, fixed cutter drill bits, and any other drill bit having a matrix bit body and capable of incorporating the teachings of the present disclosure.

For embodiments such as those shown in FIG. 3, the matrix drill bit 220 may include a metal shank 230 with a metal blank 236 securely attached thereto (e.g., at weld location 239). The metal blank 236 extends into matrix bit body 250. The metal shank 230 includes a threaded connection 234 distal to the metal blank 236.

The metal shank 230 and metal blank 236 are generally cylindrical structures that at least partially define corresponding fluid cavities 232 that fluidly communicate with each other. The fluid cavity 232 of the metal blank 236 may further extend longitudinally into the matrix bit body 250. At least one flow passageway (shown as a flow passageway 242) may extend from the fluid cavity 232 to exterior portions of the matrix bit body 250. Nozzle opening 254 may be defined at the end of the flow passageway 242 at the exterior portions of the matrix bit body 250.

A plurality of indentations or pockets 258 are formed in the matrix bit body 250 and are shaped or otherwise configured to receive PDC cutters (e.g., the PDC cutter 100 of FIGS. 1A-1B).

Figure 4:
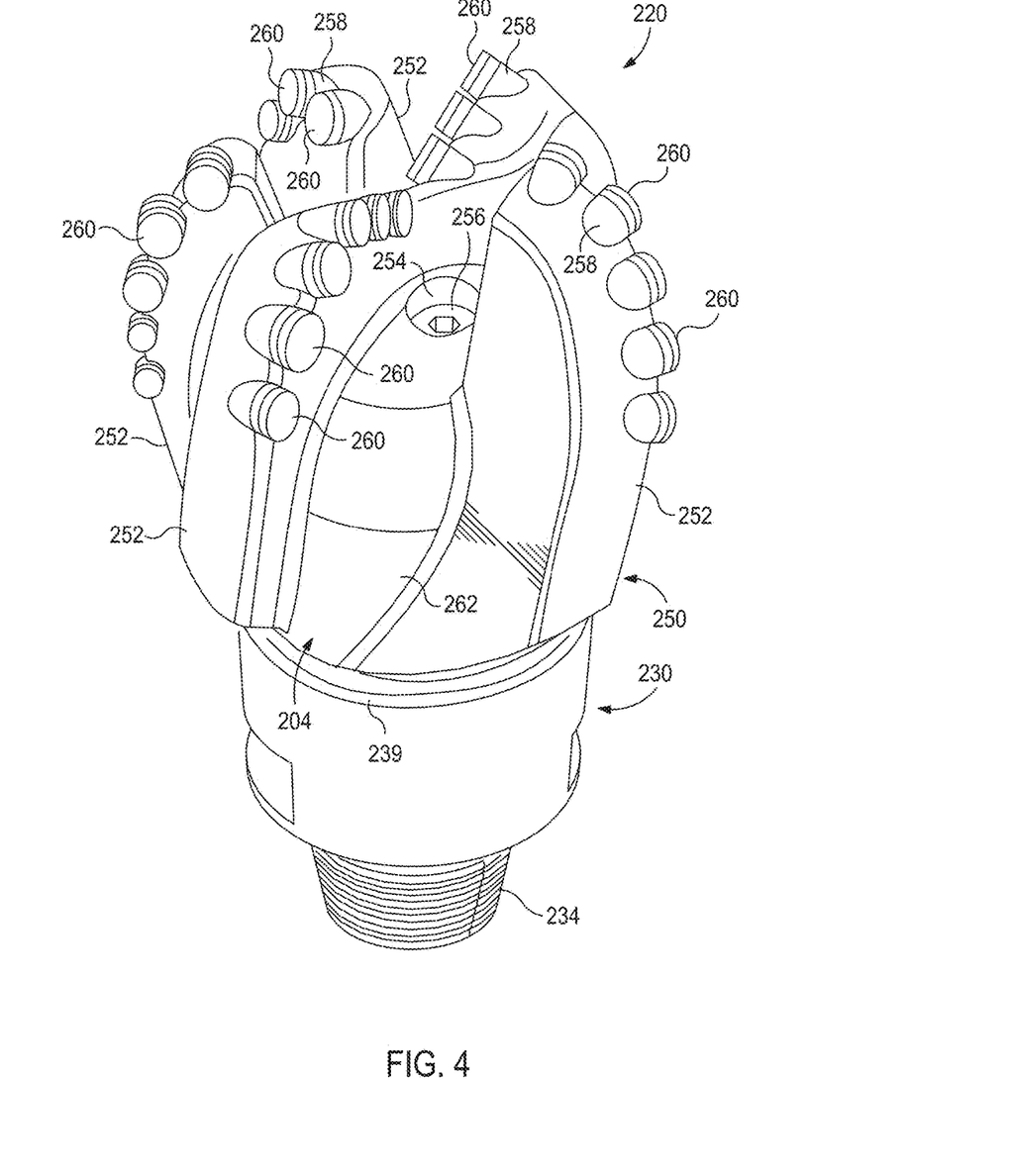
FIG. 4 is an isometric view of the matrix drill bit that includes a plurality of PDC cutters according to at least some embodiments of the present disclosure.

FIG. 4 is an isometric view of the matrix drill bit 220 that includes a plurality of PDC cutters 260 according to at least some embodiments of the present disclosure. As illustrated, the matrix drill bit 220 includes the shank 230 to form a bit body 250, as generally described above with reference to FIG. 3.

The matrix bit body 250 includes a plurality of cutter blades 252 formed on the exterior of the matrix bit body 250. Cutter blades 252 may be spaced from each other on the exterior of the matrix bit body 250 to form fluid flow paths or junk slots 262 therebetween.

As illustrated, the plurality of pockets 258 may be formed in the cutter blades 252 at selected locations. A PDC cutter 260 may be securely mounted (e.g., via brazing) in each pocket 258 to engage and remove portions of a subterranean formation during drilling operations. More particularly, each PDC cutter 260 may scrape and gouge formation materials from the bottom and sides of a wellbore during rotation of the matrix drill bit 220 by an attached drill string.

A nozzle 256 may be disposed in each nozzle opening 254. For some applications, nozzles 256 may be described or otherwise characterized as "interchangeable" nozzles.

Figure 5:
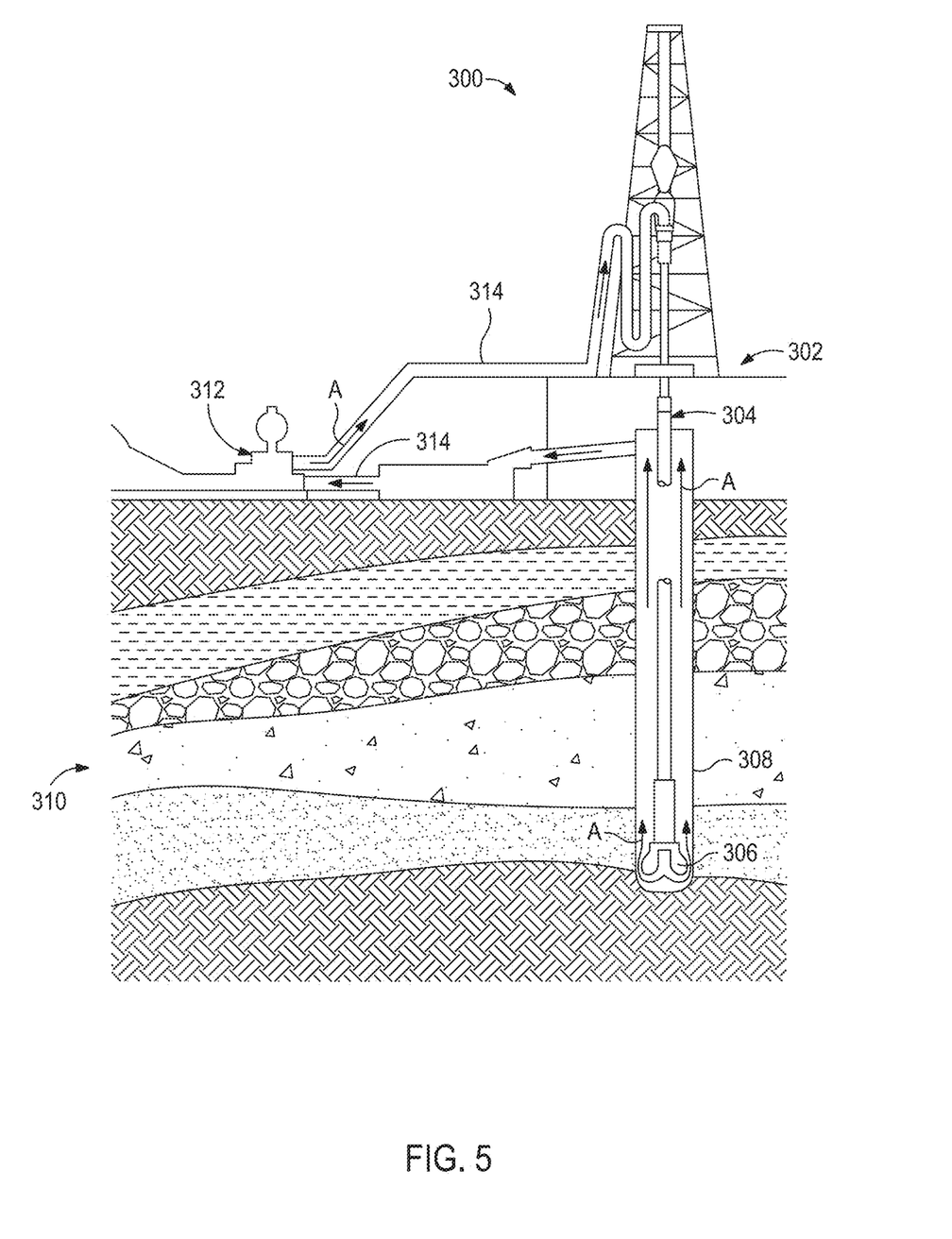
FIG. 5 is a schematic showing one example of a drilling assembly suitable for use in conjunction with matrix drill bits that include the PDC cutters of the present disclosure.

FIG. 5 is a schematic showing one example of a drilling assembly 300 suitable for use in conjunction with matrix drill bits that include the PDC cutters of the present disclosure (e.g., matrix drill bit 220 of FIGS. 3-4 and PDC cutter 100 of FIGS. 1A-1B). It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 300 includes a drilling platform 302 coupled to a drill string 304. The drill string 304 may include, but is not limited to, drill pipe and coiled tubing, as generally known to those skilled in the art apart from the particular teachings of this disclosure. A matrix drill bit 306 according to the embodiments described herein is attached to the distal end of the drill string 304 and is driven either by a downhole motor and/or via rotation of the drill string 304 from the well surface. As the drill bit 306 rotates, it creates a wellbore 308 that penetrates the subterranean formation 310. The drilling assembly 300 also includes a pump 312 that circulates a drilling fluid through the drill string (as illustrated as flow arrows A) and other pipes 314.

One skilled in the art would recognize the other equipment suitable for use in conjunction with drilling assembly 300, which may include, but is not limited to, retention pits, mixers, shakers (e.g., shale shaker), centrifuges, hydrocyclones, separators (including magnetic and electrical separators), desilters, desanders, filters (e.g., diatomaceous earth filters), heat exchangers, and any fluid reclamation equipment. Further, the drilling assembly may include one or more sensors, gauges, pumps, compressors, and the like.

Embodiments disclosed herein include Embodiment A, Embodiment B, and Embodiment C.

Embodiment A is a method that involves brazing a polycrystalline diamond table to a hard composite substrate with a braze alloy at a braze temperature between 1° C. above a solidus temperature of the braze alloy and 200° C. above a liquidus temperature of the braze alloy; and cooling the braze alloy to form a braze joint between the polycrystalline diamond table and the hard composite substrate, wherein the braze joint comprises at least 40% by volume of a dispersed particulate microstructure composed of a particulate inter-metallic phase having a diameter of 0.5 μm to 2.0 μm and an aspect ratio of 1 to 5 dispersed in a ductile matrix.

Embodiment A may have one or more of the following additional elements in any combination: Element 1: wherein the braze temperature is between 1° C. above a solidus temperature of the braze alloy and 100° C. above a liquidus temperature of the braze alloy; Element 2: wherein the braze temperature is between 1° C. above a solidus temperature of the braze alloy and 50° C. above a liquidus temperature of the braze alloy; Element 3: wherein the braze temperature is between 1° C. above a solidus temperature of the braze alloy and a liquidus temperature of the braze alloy; Element 4: wherein the braze temperature is between 5° C. above a solidus temperature of the braze alloy and 200° C. above a liquidus temperature of the braze alloy; Element 5: wherein the braze temperature is between 5° C. above a solidus temperature of the braze alloy and 100° C. above a liquidus temperature of the braze alloy; Element 6: wherein the braze temperature is between 5° C. above a solidus temperature of the braze alloy and 50° C. above a liquidus temperature of the braze alloy; Element 7: wherein the braze temperature is between 5° C. above a solidus temperature of the braze alloy and a liquidus temperature of the braze alloy; Element 8: wherein brazing involves: holding at the braze temperature for 1 second to 30 minutes; Element 9: wherein brazing involves: holding at the braze temperature for 1 second to 5 minutes; Element 10: wherein brazing involves: holding at the braze temperature for 1 second to 1 minute; Element 11: wherein brazing involves: heating the braze alloy to a first temperature, holding at the first temperature for 1 second to 30 minutes, and continuing to heat the braze alloy to the braze temperature; Element 12: wherein the braze joint comprises at least 50% by volume of the dispersed particulate microstructure; Element 13: wherein the braze joint comprises at least 70% by volume of the dispersed particulate microstructure; Element 14: wherein the braze joint comprises at least 90% by volume of the dispersed particulate microstructure; and Element 15: wherein the braze alloy comprises particulates dispersed in a base alloy, the particulates comprising metallic particulates, ceramic particulates, or a combination thereof and having a diameter of 0.1 μm to 5.0 μm and an aspect ratio of 1 to 10.

By way of non-limiting example, exemplary combinations applicable to Embodiment A include: one of Elements 1-7 in combination with one of Elements 8-10; one of Elements 1-7 in combination with one of Elements 12-14; one of Elements 8-10 in combination with one of Elements 12-14; one of Elements 1-7 in combination with one of Elements 8-10 and one of Elements 12-14; Element 15 in combination with any of the foregoing; Element 11 in combination with any of the foregoing; Element 11 and/or Element 15 in combination with one of Elements 1-7; Element 11 and/or Element 15 in combination with one of Elements 8-10; and Element 11 and/or Element 15 in combination with one of Elements 12-14.

Embodiment B is a polycrystalline diamond compact cutter that includes a polycrystalline diamond table bound to a hard composite substrate at a braze joint that comprises at least 40% by volume of a microstructure composed of a particulate inter-metallic phase having a diameter of 0.5 μm to 2.0 μm and an aspect ratio of 1 to 5 dispersed in a ductile matrix.

Embodiment C is a drilling assembly that includes a drill string extending into a wellbore; a pump fluidly connected to the drill string and configured to circulate a drilling fluid into the drill string and through the wellbore; and a drill bit attached to an end of the drill string, the drill bit having a matrix bit body and a plurality of polycrystalline diamond compact cutters coupled to an exterior portion of the matrix bit body, at least one of the polycrystalline diamond compact cutters comprising a polycrystalline diamond table bound to a hard composite substrate at a braze joint that comprises at least 40% by volume of a microstructure composed of a particulate inter-metallic phase having a diameter of 0.5 μm to 2.0 μm and an aspect ratio of 1 to 5 dispersed in a ductile matrix.

Embodiments B and C may have one or more of the following additional elements in any combination: Element 12; Element 13; Element 14; and Element 15. By way of non-limiting example, exemplary combinations applicable to Embodiments B and C include: Element 15 in combination with one of Elements 12-14.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

PDC cutters with a configuration similar to FIG. 1A were prepared with a hard composite substrate formed of a tungsten carbide dispersed in cobalt hard composite, a copper(27.6%)-silver(70.6%)-titanium(1.8%) braze alloy, and a TSP diamond. Three PDC cutters were formed for each of the temperature profiles in Table 1.

TABLE 1

| Temp. Profile | Intermediate Temp. Isotherm (° C.) | Intermediate Temp. Isotherm Time (min) | Heating Rate (° C./min) | Braze Temp. Isotherm (° C.) | Braze Temp. Isotherm Time (min) | Cooling Rate (° C./min) |
|---|---|---|---|---|---|---|
| 1 | 750 | 15 | 5 | 850 | 30 | 5 |
| 2 | 750 | 15 | 5 | 850 | 10 | 5 |
| 3 | 750 | 15 | 5 | 850 | 1 | 5 |

Figure 6:
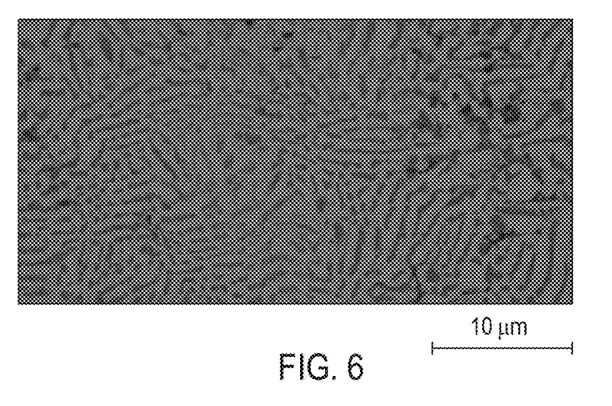
FIG. 6 is an SEM micrograph of a braze joint cross-section with a microstructure that is predominantly an elongated (e.g., worm-like) inter-metallic phase dispersed in the ductile matrix, also known as a eutectic microstructure.
Figure 7:
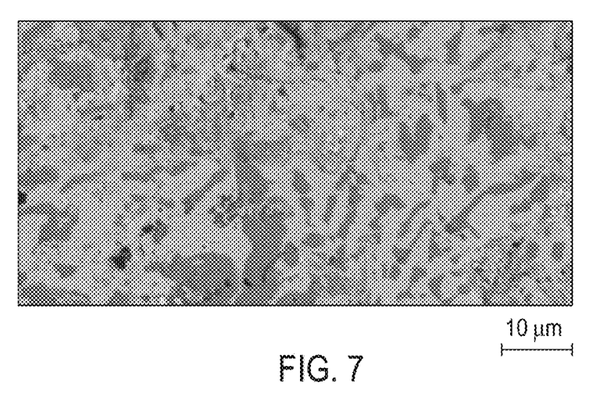
FIG. 7 is an SEM micrograph of a braze joint cross-section with a microstructure that is predominantly a large particulates inter-metallic phase dispersed in the ductile matrix.
Figure 8:
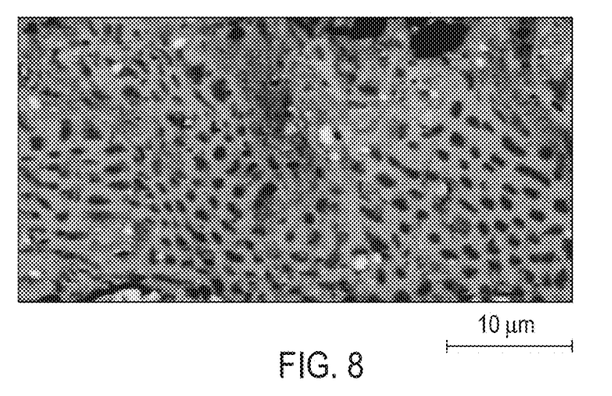
FIG. 8 is an SEM micrograph of a braze joint cross-section with both (1) a dispersed particulate microstructure and (2) a eutectic microstructure.

Once formed, two PDC cutters from each temperature profile were used for generating joint strength data, and one cutter was cross-sectioned in half for scanning electron microscopy (SEM) analysis. In the SEM micrographs, the inter-metallic phase of the braze alloy is darker than the ductile matrix. FIG. 6 is an exemplary SEM micrograph of a braze joint cross-section when prepared by Temperature Profile 1, which shows a microstructure that is predominantly a eutectic microstructure. FIG. 7, corresponding to Temperature Profile 2, shows a microstructure that is predominantly a large particulates inter-metallic phase dispersed in the ductile matrix. FIG. 8, corresponding to Temperature Profile 3, shows a braze joint with predominantly a dispersed particulate microstructure.

The shear strength of two PDC cutters formed by each temperature profile was measured with a cross head speed of 0.375 in/min and is reported in Table 2.

TABLE 2

| Temp. Profile | Shear Strength (psi) |
|---|---|
| 1 | 4,800 |
| 1 | 5,900 |
| 2 | 22,900 |
| 2 | 20,900 |
| 3 | 32,700 |
| 3 | 28,800 |

The shear strength and correspondence to the microstructures illustrates that the dispersed particulate microstructure described herein provides enhanced shear strength of the braze joint of a PDC cutter. Such increased shear strength may increase the efficiency, performance, and lifetime of the PDC cutter and, consequently, the drill bit to which the PDC cutter is attached, which decreases costs associated with replacing drill bits during a drilling operation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   brazing a polycrystalline diamond table to a hard composite substrate with a braze alloy at a braze temperature between 1° C. above a solidus temperature of the braze alloy and 200° C. above a liquidus temperature of the braze alloy, wherein the brazing is performed at a reduced pressure of 1 kPa to 100 kPa; and
   cooling the braze alloy to form a dispersed particulate microstructure in a braze joint between the polycrystalline diamond table and the hard composite substrate, wherein the braze joint comprises at least 40% by volume of the dispersed particulate microstructure composed of a particulate inter-metallic phase having a diameter of 0.5 μm to 2.0 μm and an aspect ratio of 1:1 to 5:1 dispersed in a ductile matrix.

2. The method of claim 1, wherein the braze temperature is between 1° C. above the solidus temperature of the braze alloy and 100° C. above the liquidus temperature of the braze alloy.

3. The method of claim 1, wherein the braze temperature is between 1° C. above the solidus temperature of the braze alloy and 50° C. above the liquidus temperature of the braze alloy.

4. The method of claim 1, wherein the braze temperature is between 1° C. above the solidus temperature of the braze alloy and the liquidus temperature of the braze alloy.

5. The method of claim 1, wherein brazing involves: holding at the braze temperature for 1 second to 30 minutes.

6. The method of claim 1, wherein brazing involves: holding at the braze temperature for 1 second to 5 minutes.

7. The method of claim 1, wherein brazing involves: holding at the braze temperature for 1 second to 1 minute.

8. The method of claim 1, wherein brazing involves: heating the braze alloy to a first temperature, holding at the first temperature for 1 second to 30 minutes, and continuing to heat the braze alloy to the braze temperature.

9. The method of claim 1, wherein the braze joint comprises at least 50% by volume of the dispersed particulate microstructure.

10. The method of claim 1, wherein the braze joint comprises at least 70% by volume of the dispersed particulate microstructure.

11. The method of claim 1, wherein the braze joint comprises at least 90% by volume of the dispersed particulate microstructure.

12. The method of claim 1, wherein the braze alloy comprises particulates dispersed in a base alloy, the particulates comprising metallic particulates, ceramic particulates, or a combination thereof and having a diameter of 0.1 μm to 5.0 μm and an aspect ratio of 1 to 10.

* * * * *